United States Patent [19]

McQueen

[11] 3,813,105

[45] May 28, 1974

[54] SEAL

[76] Inventor: Malcolm M. McQueen, 19430 Marilla St., Northridge, Calif. 91324

[22] Filed: Apr. 3, 1972

[21] Appl. No.: 240,703

[52] U.S. Cl. .............................................. 277/164
[51] Int. Cl. ............................................. F16j 9/06
[58] Field of Search ................ 277/164, 153, DIG. 2

[56] References Cited
UNITED STATES PATENTS

| | | | |
|---|---|---|---|
| 2,314,386 | 3/1943 | Brend | 277/DIG. 2 |
| 3,223,426 | 12/1965 | Reid | 277/153 |
| 3,406,979 | 10/1968 | Weber | 277/164 X |
| 3,603,602 | 9/1971 | Padula | 277/164 |

*Primary Examiner*—Samuel B. Rothberg
*Attorney, Agent, or Firm*—John J. Posta, Jr.

[57] ABSTRACT

The invention involves a "O" ring seal having embedded or bonded therein a spring or other member made of a material having a lower coefficient of expansion and higher modulus of elasticity than the material of which the seal itself is made, to thereby control and limit circumferential expansion and swelling of the seal when subjected to varying environmental and/or operating conditions.

4 Claims, 7 Drawing Figures

PATENTED MAY 28 1974 3,813,105

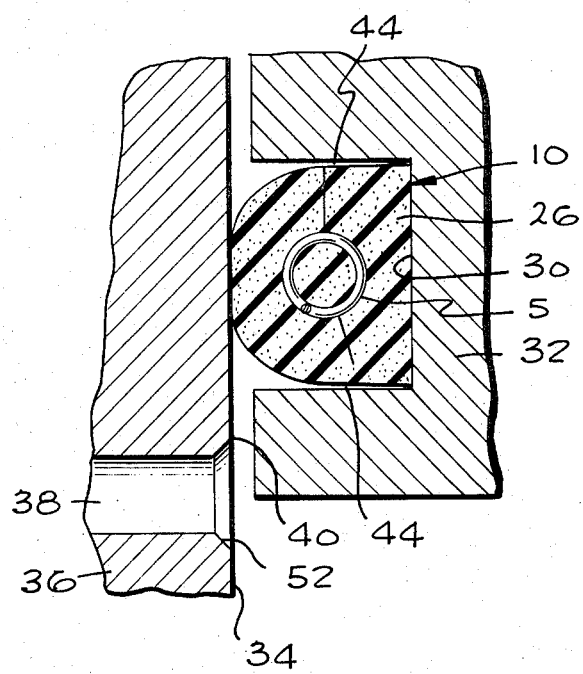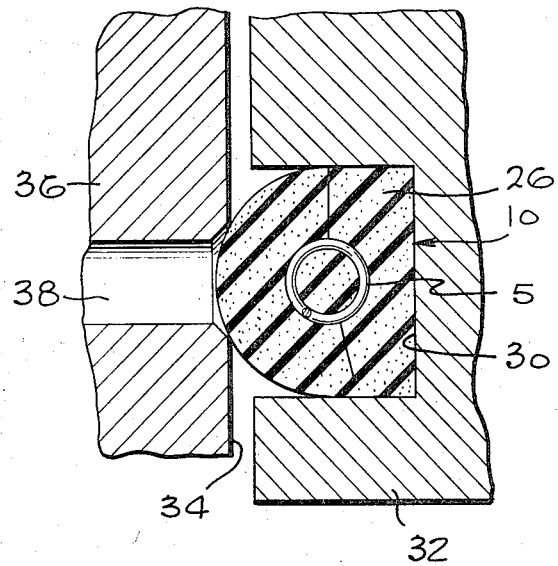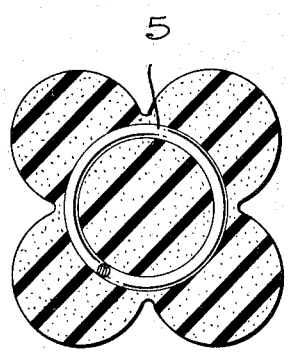

SEAL

BACKGROUND OF THE INVENTION

1. Field of the Invention

The field of the invention is the art of sealing devices and especially the art pertaining to "O" ring-type seals and mechanisms for preventing undesirable distortion from environmental conditions.

2. Description of the Prior Art

The field of O-rings generally relates to the use of flexible seals shaped like an "O" which are adapted to be inserted in a groove or channel running about the periphery of a circular insert member, such as a piston. The elastic nature of the ring allows it to be circumferentially stretched while it is placed over the head of the piston into its groove. The piston in turn is adapted to operate in a body having a bore hole, with the diameter of the bore hole being slightly in excess of the diameter of the piston. When the O-ring seal is in place in the groove, the outside diameter of the seal is slightly larger than the diameter of the bore hole. When the piston with a seal in its groove is then inserted into the bore hole, the bore hole exerts a pressure on the seal, forcing it further into the groove. Sliding contact exists between the piston with seal and the inner surface of the bore hole, and a movable seal is effected between the areas on opposite sides of the seal.

Similarly, balls with ring grooves held in spherical cavities also seal by deforming the O-ring against the bottom of the groove and the spherical housing. Plug valves also employ seals that contact the cylinder walls but do so in a fashion wherein the O-ring surrounds a part that is at a right angle to the bore axis. Butterfly valves also employ an O-ring in a groove, and the seal is effected against a cylindrical, or in some instances against a spherical, surface. In this instance, the seal is brought into contact with the mating surface by rotating the sealing element about an axis at right angles to the bore.

In those instances where the seal was operating solely upon the inner surface of a continuous bore hole, the principal factors affecting wear on the seal were the medium in which the seal was operating and the sliding friction developed by movement of the piston in the bore. However, O-rings began to be used in applications wherein the bore had a series of one or more openings or interruptions on its mating surface; for example, in spool valve applications or in the aforementioned ball, plug and butterfly embodiments. In these instances, the seal encountered a new wear factor. As earlier noted, the inner continuous surface of the bore maintained a pressure on the seal directing it substantially uniformly inward against the base of the groove in the piston. But when an opening or discontinuity was encountered in the inner surface of the bore, the seal extended outwardly from the groove into such opening. Then when the seal was moved back to its original position wherein the seal contacted the continuous inner surface of the bore, a shearing force was exerted on the seal while trying to squeeze the seal back into its original position. Needless to say, this caused extreme wear and tear if not cutting of the seal, thereby significantly decreasing its useful life.

In the applications noted above, another problem encountered was the spiral failure of O-rings, which occurs when high pressures are non-uniformly applied to the surface of the "O" ring in dynamic axial motion devices. In these instances, one portion of the ring will tend to roll while other portions skid, resulting in a twisting of the ring until fracture occurs. Applicant's invention solves this problem in a manner hereafter set forth.

The problem set forth above was magnified when such valves were used to control the flow of fluids having characteristics causing the seal to absorb same and increase in size. Additionally, the use of such valves in environments having high temperature operational characteristics also cause the seal to swell, further compounding the problem. Furthermore, pressure loads on the seal, particularly in the case of butterfly valves, tend to force the seal out of the groove which caused seal destruction upon actuation thereof.

Although the problems with the O-ring seal in this type of application have heretofore been recognized, no satisfactory solution had been developed prior to applicant's invention. Attempts were made to place split rings made of metal over part of the O-ring on either side thereof in the groove of the piston to retain the O-ring in its seat, but these methods proved futile. When expansive forces developed in the O-ring, it squeezed out from its retaining split rings and into the opening formed in the bore wall. Attempts were also made to employ cap seals unbonded to the rubber seal made of soft plastic such as Teflon, to retain the rubber seal in the groove. Before applicant's invention, there appeared to be no way for effectively allowing for internal expansion of the O-ring in such changed environmental conditions while essentially maintaining the circumference of the ring constant by preventing elongation of the ring circumferentially. Applicant has solved the stated problem in a manner more fully hereinafter set forth.

SUMMARY OF THE INVENTION

An object of the invention is to provide a new seal.

Another object of the invention is to provide a new ring seal that is inexpensive and easily replaceable in the field.

A further object of the invention is to provide a ring seal which essentially maintains a constant circumference and circular shape after being subjected to forces which normally would elongate or enlarge same.

Another object is to teach a means for fabricating the seal such that the spring-like device is held in a position that will not interfere with the sealing mechanism.

Yet another object of the invention is to provide a ring seal having a member imbedded therein, such that the imbedded member is prevented from interfering with the sealing properties of the seal.

A still further object of the invention is to provide a composite seal essentially comprised of an outer flexible member surrounding a flexible inner member, wherein the outer and inner members have different coefficients of expansion and the inner member has a greater modulus of elasticity than the outer member.

Still another object of the invention is to provide a composite ring seal made of a rubber-like composition and having a metal spring imbedded therein.

Another object of the invention is to provide a new O-ring seal which inherently resists spiral fracture when subjected to operational torsional stress.

A still further object of the invention is to provide a composite O-ring seal including a metal spring shaped in the form of a toroid and being enclosed or bonded into a rubber sheath.

A further object of the invention is to provide a composite seal of two or more materials which can sustain distortion within the elastic limit of all members during assembly and return to its desired functional shape after assembly.

As was heretofore noted, prior art attempts failed to solve the seal expansion problem primarily because the circumferential expansion and or circular distortion of the seal was not prevented. Applicant generally provides an O-ring seal made from rubber or any other generally accepted material for making a flexible seal. This ring seal has bonded and/or imbedded in its core a continuously circumferentially extendable member which has a significantly different coefficient of expansion than the rubber or like material. In the preferred embodiment, this inner seal member takes the form of a spring having a higher modulus of elasticity than the seal material. Under considerable force, the spring can be expanded so as to place the O-ring in place over the head and into the groove of a piston or other member wherein the seal must be stretched or compressed to properly install it. However, if in operation, the ring seal is subjected to pressure loads, high temperatures and/or seal expanding fluids, the seal will expand and swell. Since the spring itself is relatively rigid and refuses to elongate circumferentially, the rubber sheath of the ring seal in which the spring is bonded and/or imbedded will likewise hold its circumferential dimension relatively constant. Essentially, expansion of the rubber sheath will take place in a direction perpendicular to the surface of the seal, but not parallel thereto, due to the inhibiting effect of the inner spring.

BRIEF DESCRIPTION OF THE DRAWINGS

FIG. 4 is a cross-section of a piston having a ring seal in place on a circumferential groove, with the piston nested inside a bore hole.

FIG. 5 is the piston, seal and bore hole arrangement of FIG. 4, but with the location of the piston and seal within the bore hole being different.

FIG. 7 is a cross-section view of the bonded and imbedded spring in a quad-ring.

DESCRIPTION OF THE PREFERRED EMBODIMENT

Figure 1:
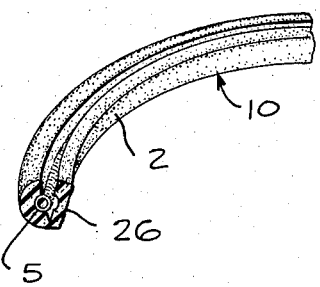
FIG. 1 is a partial perspective view of the seal.
Figure 2:
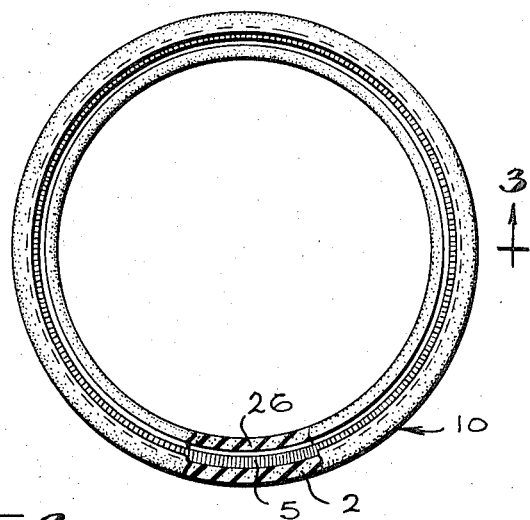
FIG. 2 is a plan view of the seal.

FIG. 1 is a perspective drawing of the composite O-ring seal; while FIG. 2 is a plan view of the seal. By reference to FIG. 3, we can clearly see a spring 5, shown in FIG. 7, imbedded along the inner core of seal 10. The seal 10 is essentially made of a flexible rubber 2 or equivalent flexible material with the spring 5 imbedded and bonded therein.

Figure 6:
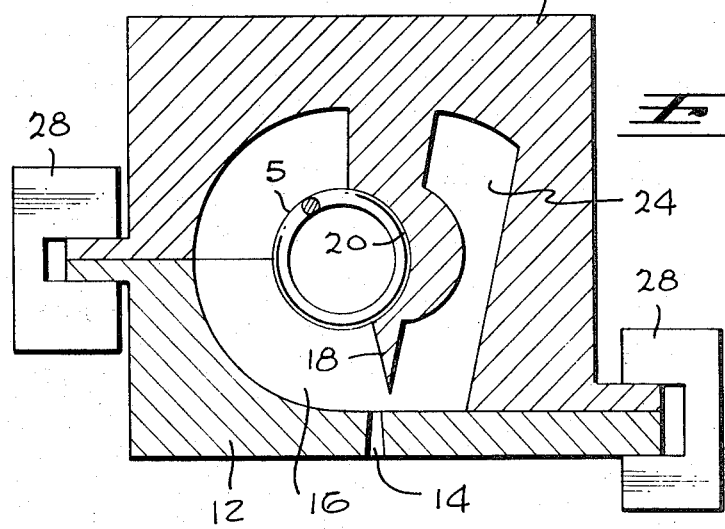
FIG. 6 is a partial cross-sectional view of a mold for making the preferred version of the composite ring seal.

Referring to FIG. 6, we can see one method of manufacturing the ring seal 10. A lower annular mold 12 is provided having one or more inlet ports 14. Lower mold 12 has a cavity 16 therein, with a support structure 18 extending into the cavity 16. This support structure 18 has a recess 20 on one side thereof which serves to support a spring 5 located therein.

An inner cylindrical mold 22 is provided which mates with mold 12 to form the chamber into which the flexible seal material is injected via port 14. The recess 24 is formed in mold 22 to enable formation of a closure flap 26 on seal 10. Suitable mold closure means 28 are provided.

In forming the composite seal 10, one first takes a length of a spiral spring and screws both free ends into one another to make a mechanical interlock, thereby effecting a continuous spring in the form of a circle. This continuous spring 5 is then placed in recess 20 on mold 12. The upper mold 22 is then fastened to mold 12 by closure means 28. The material 2 of which the seal will be made is introduced in a liquid or semiliquid state through port 14, whereby it completely fills all voids in cavity 16 and recess 24, and, depending upon the seal material employed, bonds itself to spring 5. After the material 2 sets and hardens, closure means 28 are opened, and the complete flexible seal is readily removed from the mold.

Figure 3:
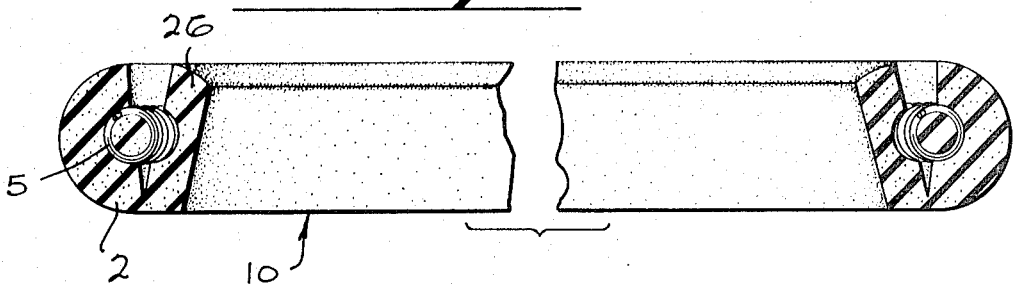
FIG. 3 is a cross-section of the seal taken along lines 3—3 of FIG. 2.

FIG. 3 shows the seal 10 in its inoperative state, while FIG. 4 shows the seal in place in a groove 30 extending about a piston 32, with the seal 10 but not being subject to any extreme environment. The piston 32 is in sliding contact with the inside bore hole surface 34 of outer tubular of member 36. The surface 34 of member 36 has an opening 38 in communication with the bore hole, and, in this application, the seal 10 encircling piston 32 is designed to be moved across opening 38 when in operation. The opening 38 is provided with a beveled edge at 52 to reduce wearing of the seal 10 when moving past the opening 38.

Since the inner surface 34 exerts a slight deforming pressure on seal 10, it is apparent that when the seal 10 reaches opening 38, it will slightly protrude into opening 38. On returning to its original position, this protruding section will abut against the edge 40 of opening 38, producing a shearing action on seal 10. In friendly environments, this small protrusion of the seal and the attendant shearing action do not present a great problem due in part to the inherent flexible nature of the seal 10. This is not true when the seal is placed in a hostile environment.

In many applications, the seal may be subjected to a fluid medium of high temperatures, which can permeate into the seal, causing swelling, and in any event, causing expansion of the seal material because of the higher temperature. An increase in the volumetric displacement of the seal is also caused by excessive heat generated by the friction between the seal 10 and inner surface 34 where the frequency of relative displacement therebetween is significant. Similarly, pressure loads on the seal can cause the seal to be forced out of its groove and thereby to be damaged on actuation.

When subjected to such volumetric expansion or distortion forces, the seal 10 will attempt to grow both perpendicular to its outer surface, as well as along the circumferential length thereof. Expansion would normally take place in this manner in ordinary O-rings, but not so in Applicant's ring seal 10. Since the spring 10 has a lower coefficient of thermal expansion and high rigidity, the spring 5, being imbedded within the composite seal 10, will remain relatively rigid in such environmental extremes, thereby resisting and containing circumferential elongation of seal 10. Since the expanded material 2 must go somewhere, it moves perpendicular to the surface of seal 10 into the enlarged areas 44 of groove 30. The seal 10 in FIG. 5 is in an extreme environmental condition and is positioned over opening 38 in surface 34, but the seal has not significantly expanded into the opening 38, due to the retentive forces of imbedded spring 5.

It is now apparent how the composite seal resists the spiral fracture hereinabove referred to. The presence of the imbedded spring with its increased resistance to torsional stress and shear failure (relative to rubber) results in a longer operational life.

In a preferred embodiment of the invention, wherein opposed sides of the split O-ring are subjected to different pressures, it would be advisable for the split side of the ring to be located on the low pressure side. If the split side were exposed to the high pressure side, there would be a tendency to open up the split side and thereby cause undue strain on the reverse side of the ring.

It is apparent that various types of flexible materials other than rubber can be employed in the manufacture of the seal. The specific material chosen would depend upon particular design considerations. Likewise the inner core member can be made of metallic or other members either having the shape of a spring or other physical shapes. The primary requirement of the inner core member is to have a coefficient of expansion different from the flexible material and a higher modulus of elasticity so as to maintain the circumferential length of the seal in varying environmental and service conditions. Furthermore, the particular type of mold or other manufacture employed would also be dictated by specific design considerations.

The specific shape of the seal formed to take advantage of the invention can also be readily varied in an obvious way dictated by specific desired design considerations or manufacturing requirements. The seal can take the shape of a ring having a circular cross-section with the spring imbedded in the center. Alternately, the cross-section might be of quadangular form, as shown in FIG. 7, with the spring imbedded in the center thereof. Other cross-sections might take the form of a "D," a square or any other well-known forms for a seal.

The specific embodiment of the invention shown herein is meant to be illustrative only, it being the intent of Applicant to limit his invention solely to the scope as defined by the appended claims.

What is claimed and desired to be secured by United States letters patent is:

1. A composite seal comprising a closed ring of flexible material having a reinforcing member partially imbedded therein, said closed ring of flexible material having a first section and a second section, a part of said first section and a part of said second portion being integrally connected only along a base portion of each of said first and second sections, said first section having a generally hemispherical cross-section, said second portion having a generally rectangular cross-section, said flexible material and said reinforcing member having dissimilar coefficients of expansion and elasticity, said flexible material being of a rubber-like composition, said reinforcing member being a resilient coiled spring capable of being substantially extended in a circumferential direction, said resilient spring being partially imbedded only in said first portion of said closed ring of flexible material such that a significant portion of the spring is completely encapsulated by the flexible material and is mechanically inter-locked therein to become integral therewith, said second portion of said closed ring of flexible material having a circumferentially extending groove on the surface nearest said first portion adapted to receive therein a portion of the spring when the seal is in an operative position, said first portion of said closed ring of flexible material with the resilient spring therein adapted to move out of engagement with the groove in said second portion when the seal is in an inoperative position, wherein said second portion is adapted to overlap the exposed part of said resilient spring and part of said first portion of the flexible member.

2. The composite seal set forth in claim 1 wherein said resilient spring has a finite length and has its ends mechanically inter-locked to form a closed ring.

3. The combination of a member having a circumferential groove, a composite seal as set forth in claim 1 disposed in said groove, said composite seal having sufficient flexibility to be stretched over said member prior to being disposed in said groove, and a tubular bore member adapted to receive said member having the composite seal disposed in said groove.

4. The combination of a member set forth in claim 3 wherein said resilient spring has a finite length and has its ends mechanically inter-locked to form a closed ring.

* * * * *